(12) United States Patent
Kirzner et al.

(10) Patent No.: US 7,552,185 B1
(45) Date of Patent: Jun. 23, 2009

(54) METHOD FOR ASSOCIATING INDIVIDUALS OR EMAIL GROUPS WITH A SPECIFIC RECIPIENT FIELD

(75) Inventors: Eli Kirzner, Haifa (IL); Itzhack Goldberg, Hadera (IL); Yotam Medini, Binyamina (IL); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/180,742

(22) Filed: Jul. 28, 2008

(51) Int. Cl.
*G06F 15/16* (2006.01)
*G06F 3/00* (2006.01)

(52) U.S. Cl. .................... 709/206; 715/752
(58) Field of Classification Search ............... 709/206; 715/752; 700/103
See application file for complete search history.

(56) References Cited

U.S. PATENT DOCUMENTS

| | | | |
|---|---|---|---|
| 5,917,489 A | 6/1999 | Thurlow et al. | |
| 2002/0107928 A1 | 8/2002 | Chalon | |
| 2005/0135681 A1 | 6/2005 | Schirmer | |
| 2006/0026244 A1 | 2/2006 | Watson | |
| 2007/0143418 A1 | 6/2007 | Tribble et al. | |
| 2007/0294428 A1 | 12/2007 | Guy et al. | |
| 2008/0021962 A1 | 1/2008 | Ryan et al. | |

FOREIGN PATENT DOCUMENTS

EP 1871059 A1 12/2007

*Primary Examiner*—Jeffrey Pwu
*Assistant Examiner*—Jerry Dennison
(74) *Attorney, Agent, or Firm*—Locke Lord Bissell & Liddell, LLP

(57) ABSTRACT

A method of managing the entry of individuals or email groups into their intended recipient field within a sender's email is disclosed. A predefined, static association between an intended recipient or email group and a To, CC, or BCC recipient field may be created by a sender. A new email message graphical user interface having General, To, CC, and BCC fields contained within the header is provided. When an individual or group is entered into the General recipient field it is automatically delegated to the To, CC, or BCC field with which it is associated. Provisions for ensuring that recipients with multiple field associations do not exist, that recipients with a predefined association are not entered into an incorrect field, for creating a predefined association with two recipient fields, and for creating a predefined association when none exists are also provided.

1 Claim, 2 Drawing Sheets

METHOD FOR ASSOCIATING INDIVIDUALS OR EMAIL GROUPS WITH A SPECIFIC RECIPIENT FIELD

BACKGROUND

1. Field of the Disclosure

This disclosure relates generally to the delivery of electronic mail. In particular, the present disclosure relates to a method of managing a sender's email recipient fields by creating a predefined association between selected individuals and specified recipient fields.

2. Description of the Related Art

With the rapid development of the Information Age, electronic mail (email) has become a convenient and reliable means of communication. Email messages have adopted a format similar to that employed by standard written mail, being comprised of a header followed by the body of the message itself. The header typically contains a series of recipient fields which include a Primary or To field, a CC or carbon copy field, and a BCC or blind carbon copy field.

When an email is composed and sent, each recipient receives an exact duplicate of the message. However, the action or response expected from each recipient is dependent largely upon which recipient field he/she is placed. Individuals in the To field are typically expected to provide a direct response or perform a specified action whereas individuals in the CC field are persons who have an interest in, but don't need to act upon the subject matter and whose identity does not need to be concealed. The BCC field is usually intended for recipients who have an interest in the message, but whose identity and/or incorporation on the recipient list is to be concealed.

In certain instances there may arise a need to repetitively send a large number of emails to the same recipients or to send messages of a sensitive nature. In this case it is necessary to manually enter each intended recipient in their designated recipient field. This does, however, make the process error-prone. Thus, sensitive information may be sent to the wrong recipient and/or a recipient's identity may be inadvertently disclosed to the wrong persons. Problems may also arise when a response is expected, but a person is sent an email message as a CC instead of as a To recipient resulting in the mistaken impression that the email message was provided for informational purposes only.

SUMMARY

In view of the above, it is an object of the present disclosure to provide a method of managing a sender's email recipient fields. The method provides a new General recipient field with the sole purpose of being an input pane which places recipients in a designated recipient field prior to sending the email message.

In one embodiment these advantages are realized by generating a new email message having General, Primary, CC, and BCC recipient fields. A list of recipients is entered into an email message by a user with each recipient being either an individual or email group entered into the General, Primary, CC or BCC recipient fields. It is then determined whether each recipient is associated with a transmission rule comprising a preference for receiving an email transmission as a Primary, CC or BCC recipient.

Recipients entered into the General recipient field are delegated to the Primary, CC or BCC recipient field based on the transmission rule corresponding to that recipient. If there is no transmission rule associated with a recipient in the General recipient field, the sender is prompted for a recipient field delegation. The recipient in the General recipient field is then delegated to a Primary, CC or BCC recipient field based on the sender's response to the field delegation prompt. If there is no transmission rule for a recipient then the sender is prompted to create a transmission rule for the recipient and a new transmission rule for the recipient is created based on the sender's response.

It is then determined whether a recipient's entry into a Primary, CC or BCC field conflicts with the transmission rule for the recipient and, if such a conflict exists, the sender is prompted to redelegate the recipient. The recipient is then delegated to a recipient field based on the sender's response to the redelegation prompt. It is also determined whether an individual recipient is subject to multiple transmission rules. If an individual recipient has more than one transmission rule, the sender is prompted to select a single transmission rule for the individual recipient which is then delegated to a single recipient field based on the sender's response to the multiple transmission rule prompt. Once the process is complete the email message is sent to its intended recipients.

DETAILED DESCRIPTION

Figure 1:
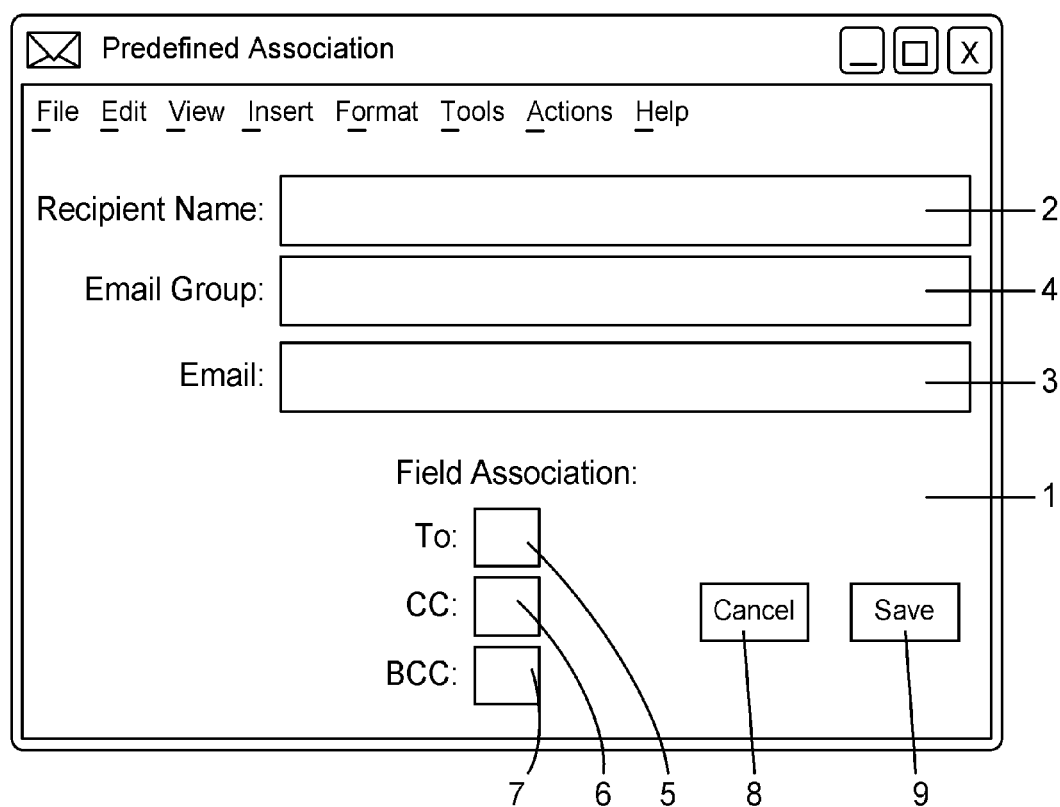
FIG. 1 shows a sample graphical user interface which may be accessed to create a predefined association between an individual and a recipient field.
Figure 2:
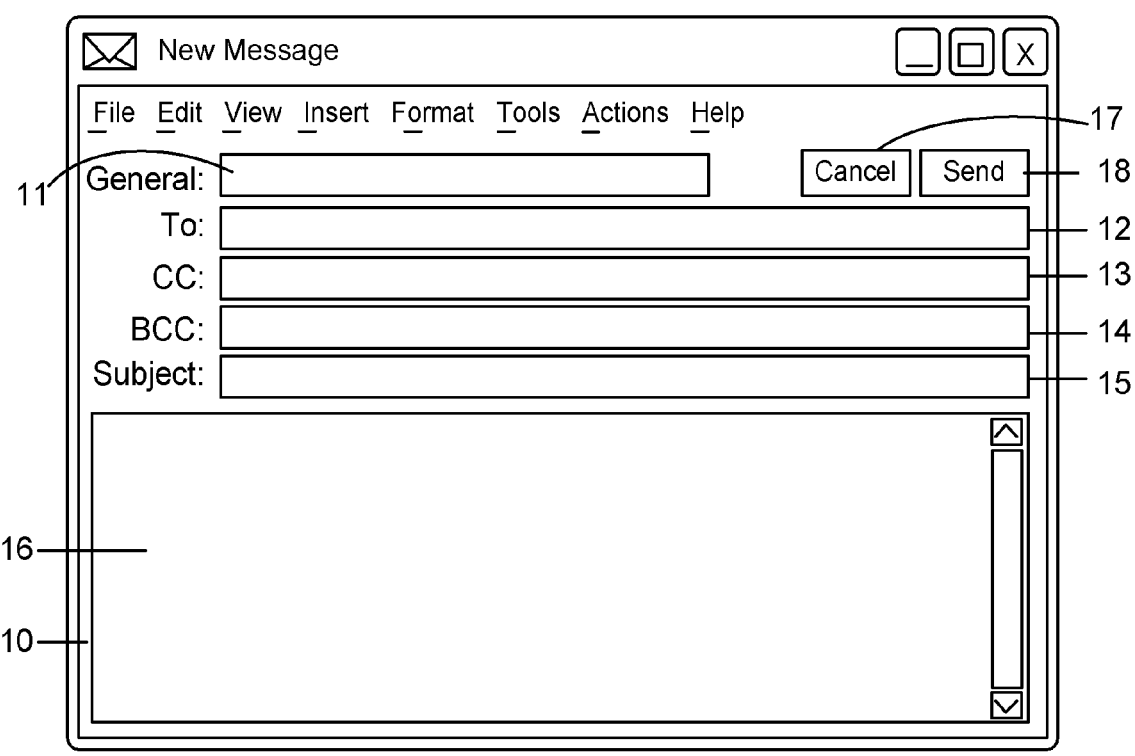
FIG. 2 shows a sample graphical user interface representative of a new email message comprising General, To, CC, and BCC recipient fields along with fields for a subject heading and the body of the message.

The above and other objectives of the disclosure will become clearer from the following description and exemplary embodiments which, when taken in conjunction with FIGS. 1-2, explain the disclosure in greater detail.

The disclosure is directed to a method of managing the delivery of email messages by creating a predefined association between specified individuals or email groups and one or two recipient fields. The method also includes provisions for automatically delegating individuals or email groups to their intended recipient field, ensuring that an email message isn't accidentally sent with individuals or email groups placed in an incorrect recipient field, and checking whether multiple recipient field designations are erroneously assigned to a single individual. The entire process is performed automatically with an error message and opportunity to correct the error being presented to the sender in the event a conflict is detected.

When a predefined association is created between an individual or email group and a recipient field this association is fully static. That is, any and all email messages that are sent to that individual or email group will be delivered with each individual placed in the recipient field with which he/she is associated. For example, if a predefined association between a recipient and the BCC field is created, any attempt to send an email message with this recipient in the To or CC field will produce an error message. Furthermore, if this recipient is a member of an email list or group and an email message is sent to the group as either a To or CC recipient, an error message will arise.

In another embodiment, a predefined association may be established between a recipient or email group and two recipient fields. In this case there will be one recipient field from among the three from which the recipient or email group is specifically excluded. As an example, if an association is made between a recipient and the To and CC fields, then this recipient can never be sent an email as a BCC recipient. This same rule also applies if the recipient is a member of an email group associated with two recipient fields. Thus, as in the previous example, if an attempt is made to send an email with the email group to which the recipient is a member included in the BCC field, an error message will be produced.

When a predefined association is created it is in effect for any kind of email message. This includes new email messages to single or multiple recipients and email groups as well as forwarded or reply messages sent to single or multiple recipients and email groups. Thus, once a predefined association is created it is overriding and all-encompassing.

This association may be set in a user's email program by, for example, accessing user preferences listed under a drop-down menu such as the "Tools" menu. An example of a graphical user interface (GUI) 1 by which predefined associations can be established is provided in FIG. 1. Here, either a recipient's name 2 and email address 3 or an email group 4 can be entered and either one or two recipient field associations can be defined. This is accomplished by checking off one or two of the radio buttons associated with the To, CC, or BCC recipient fields which are labeled 5, 6, and 7, respectively. The dialogue box is configured such that no more than two radio buttons can be checked simultaneously. Once the desired associations have been made the preferences are saved by performing an action such as, for example, clicking on the Save button 9 with a mouse pointer. If a user decides not to make an association or does not wish to change an association which has previously been established, the Cancel button 8 may be clicked.

The benefits afforded by creating a predefined association between selected recipients and one or two recipient fields may be further realized by means of a fourth recipient field. This field is identified as a General recipient field and its primary purpose is to automatically delegate recipients or email groups to their associated To, CC, or BCC field. If more than one predefined association is provided for a particular recipient or email group is entered into the General recipient field then the sender is prompted to select which of the two fields the recipient or email group is to be placed. The General recipient field is designed such that it must be empty (i.e., each recipient has been delegated to its intended field) before an email can be sent.

A sample GUI 10 which shows an email message comprising the General 11, To 12, CC 13, and BCC 14 recipient fields is shown in FIG. 2. The GUI is also comprised of areas to enter the Subject 15 and Body 16 of the message. Cancel 17 and Send 18 buttons are also provided. The General recipient field 11 is not a delivery field in itself, but rather is designed to automatically delegate recipients to their designated To 12, CC 13, or BCC 14 field. The GUI 10 allows the sender to enter any number of individual recipients or email groups in the General recipient field 11 and then perform an action such as hitting the Enter key on a keyboard to have each individual delegated to the recipient field (12-14) with which they are associated.

There are several features and safeguards which are built into the email editor which incorporate the General recipient field 11 in FIG. 2 as well as the concept of creating a predefined association in FIG. 1. For example, if an individual or email group entered into the General recipient field 11 does not have a predefined association assigned to it, then the sender is provided with a prompt to determine which recipient field the individual or group is to be delegated. The sender is also provided with the option of creating a predefined association for the individual or email group which may or may not be the same as the field delegation chosen for that particular email message.

Prior to sending an email message, the email editor checks to determine whether individuals or email groups with a predefined association are erroneously entered into the wrong recipient field. For example, if an individual associated with the To 11 field is entered into the BCC 13 field, an error prompt is presented to alert the sender of the error. The sender is then provided with the opportunity to correct the error (e.g., move the individual or email group to its associated field), make an exception, or create a new predefined association. Checks are also performed to ensure that a single recipient does not have conflicting field associations. As an example, if an attempt is made to associate an individual with the To 11 field using the GUI in FIG. 1, but this individual is already a member of an email group which is associated with the BCC 14 field; when the sender attempts to save the association, a dialogue box is presented alerting the sender of the conflict. In this case the sender can either cancel the attempt to create a new predefined association or remove the recipient from the conflicting email group. A similar situation occurs when the sender attempts to add an individual with an existing predefined association to an email group which has a different predefined association.

Once the sender has finished composing the email message the message itself may be sent by performing an action such as clicking the Send button 18 with a mouse pointer. Alternatively the message can be canceled by, for example, clicking the Cancel button 17. If any recipients remain in the General 11 field when the message is being sent, they are automatically delegated to their associated field. If no association is present, the sender is asked whether he/she wishes to create one as explained above. Before an email message is sent out to be delivered, the email editor checks each To, CC, and BCC field to ensure that there is no conflict with any existing predefined associations.

It will be appreciated by persons skilled in the art that the present disclosure is not limited to what has been particularly shown and described hereinabove. Rather, the scope of the present disclosure is defined by the claims which follow. It should further be understood that the above description is only representative of illustrative examples of embodiments. For the reader's convenience, the above description has focused on a representative sample of possible embodiments, a sample that teaches the principles of the present disclosure. Other embodiments may result from a different combination of portions of different embodiments.

The description has not attempted to exhaustively enumerate all possible variations. The alternate embodiments may not have been presented for a specific portion of the disclosure, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

What is claimed is:

1. A method of managing a sender's email recipient fields comprising:

generating a new email message having a General, Primary, CC or BCC recipient field;

receiving a list of recipients entered by a user in an email message, wherein a recipient is an individual or email group entered into the General, Primary, CC or BCC recipient fields;

determining whether each recipient is associated with a transmission rule comprising a preference for receiving an email transmission as a Primary, CC or BCC recipient;

delegating each recipient entered into the general recipient field to the Primary, CC or BCC recipient field based on the transmission rule corresponding to the recipient;

prompting the sender for a recipient field delegation where there is no transmission rule associated with a recipient in the general recipient field;

delegating the recipient in the general recipient field to a Primary, CC or BCC recipient field based on the sender's response to the field delegation prompt;

prompting the sender to create a transmission rule for the recipient if no such rule exists;

creating a new transmission rule for the recipient based on the sender's response to the transmission rule prompt;

determining whether a recipient's delegation to a Primary, CC or BCC field conflicts with the transmission rule for the recipient;

prompting the sender to redelegate a recipient if the recipient delegation to a Primary, CC or BCC recipient field conflicts with the recipient's transmission rule;

delegating the recipient to a recipient field based on the sender's response to the redelegation prompt;

determining whether an individual recipient is subject to multiple transmission rules;

prompting the sender to select a single transmission rule for the individual recipient having more than one transmission rule;

delegating the individual recipient to a single recipient field based on the sender's response to the multiple transmission rule prompt; and sending the email message to its intended recipients.

* * * * *